United States Patent
Hayashi et al.

(10) Patent No.: US 9,557,873 B2
(45) Date of Patent: *Jan. 31, 2017

(54) ELECTRONIC DEVICE AND METHOD FOR CONTROLLING THE ELECTRONIC DEVICE

(71) Applicant: Japan Display Inc., Minato-ku (JP)

(72) Inventors: Makoto Hayashi, Tokyo (JP); Jouji Yamada, Tokyo (JP); Hirofumi Nakagawa, Tokyo (JP); Michio Yamamoto, Tokyo (JP); Kohei Azumi, Tokyo (JP); Hiroshi Mizuhashi, Tokyo (JP); Kozo Ikeno, Tokyo (JP); Yoshitoshi Kida, Tokyo (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/878,755

(22) Filed: Oct. 8, 2015

(65) Prior Publication Data
US 2016/0026300 A1    Jan. 28, 2016

Related U.S. Application Data

(63) Continuation of application No. 14/183,957, filed on Feb. 19, 2014, now Pat. No. 9,195,334.

(30) Foreign Application Priority Data

Mar. 29, 2013 (JP) ................................ 2013-073869

(51) Int. Cl.
G06F 3/041 (2006.01)
G06F 3/044 (2006.01)
(Continued)

(52) U.S. Cl.
CPC .............. *G06F 3/044* (2013.01); *G06F 3/0412* (2013.01); *G06F 3/0416* (2013.01); *G06F 3/04845* (2013.01); *G06F 3/04886* (2013.01)

(58) Field of Classification Search
CPC ...... G06F 3/041; G06F 3/0412; G06F 3/0416; G06F 3/044; G06F 3/048; G06F 3/0484–3/04886
(Continued)

(56) References Cited

U.S. PATENT DOCUMENTS

2010/0090948 A1    4/2010    Oba et al.
2010/0220066 A1    9/2010    Murphy
(Continued)

FOREIGN PATENT DOCUMENTS

JP    9-91039    4/1997
JP    2010-62420    3/2010
(Continued)

OTHER PUBLICATIONS

Office Action issued Aug. 18, 2015 in Japanese Patent Application No. 2013-073869 (with English translation).

*Primary Examiner* — Nathan Danielsen
(74) *Attorney, Agent, or Firm* — Oblon, McClelland, Maier & Neustadt, L.L.P.

(57) ABSTRACT

A sensor-integrated display panel including an operation surface for performing an input operation and an image display surface which are formed integrally with a sensor as one piece. A data transfer device supplies the sensor-integrated display panel with a drive signal for driving the sensor and outputs sensing data corresponding to a potential of a sensor signal output from the sensor. A contact electrode is provided in a frame formed around the sensor-integrated display panel to vary the potential of the sensor signal when a conductor touches or does not touch to the frame. An application executing device receives and analyzes the sens- (Continued)

ing data and generates a signal to select an operating function in accordance with an analysis result.

8 Claims, 12 Drawing Sheets

(51) Int. Cl.
    *G06F 3/0484*     (2013.01)
    *G06F 3/0488*     (2013.01)
    *G06F 3/048*     (2013.01)

(58) Field of Classification Search
    USPC .......................................... 345/156, 173, 174
    See application file for complete search history.

(56) References Cited

U.S. PATENT DOCUMENTS

| | | |
|---|---|---|
| 2011/0038114 A1 | 2/2011 | Pance et al. |
| 2012/0022066 A1 | 1/2012 | Kennedy et al. |
| 2012/0050217 A1 | 3/2012 | Noguchi et al. |
| 2012/0254408 A1 | 10/2012 | Kimura et al. |
| 2012/0254808 A1 | 10/2012 | Gildfind |
| 2014/0292679 A1 | 10/2014 | Kida et al. |

FOREIGN PATENT DOCUMENTS

| | | |
|---|---|---|
| JP | 2010-191692 | 9/2010 |
| JP | 2012-48295 | 3/2012 |

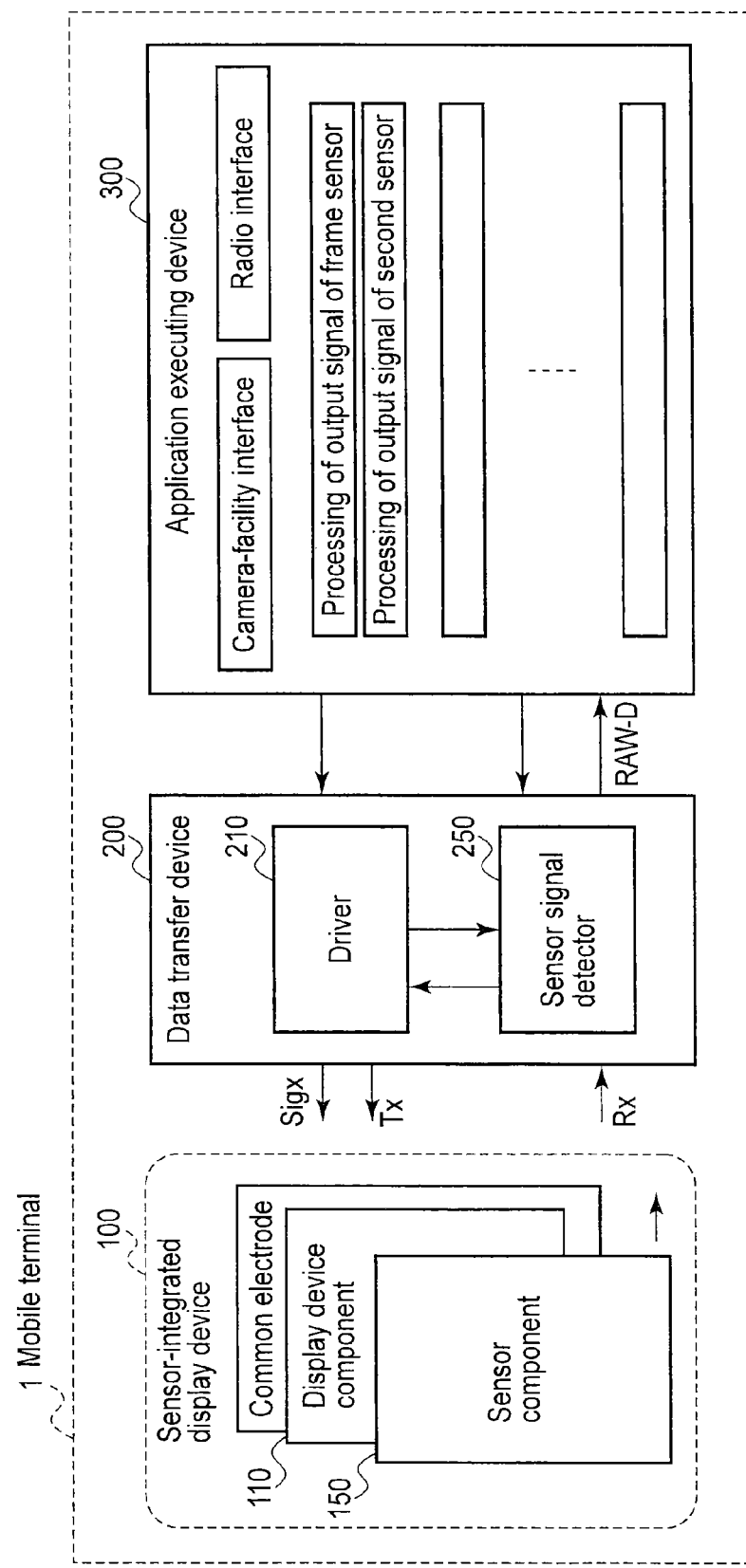
F I G. 1

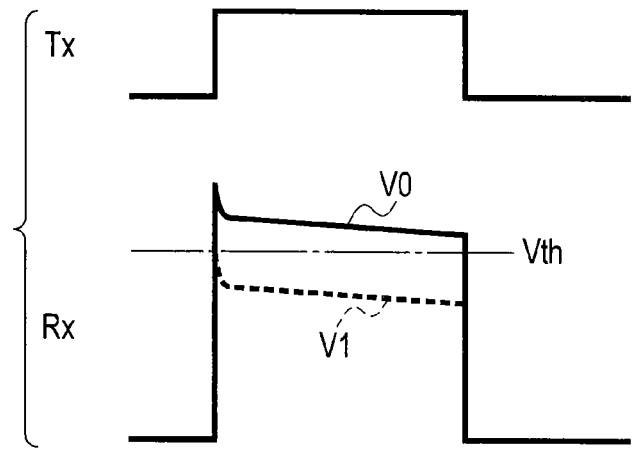
F I G. 2 B
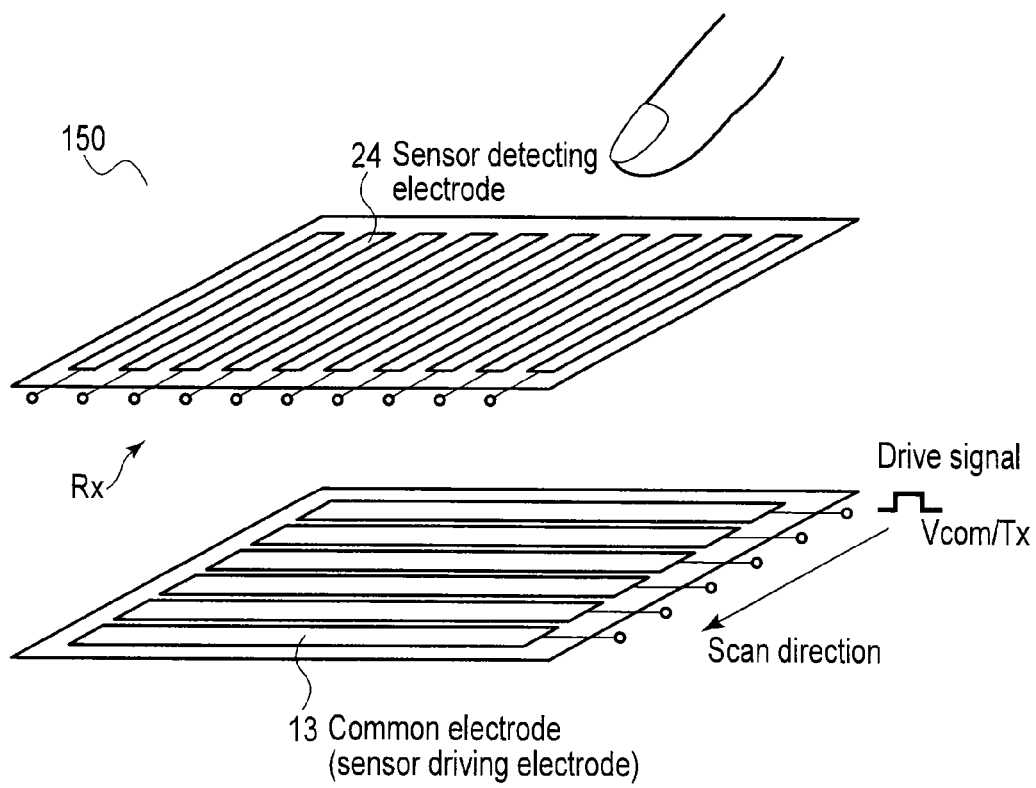
F I G. 3

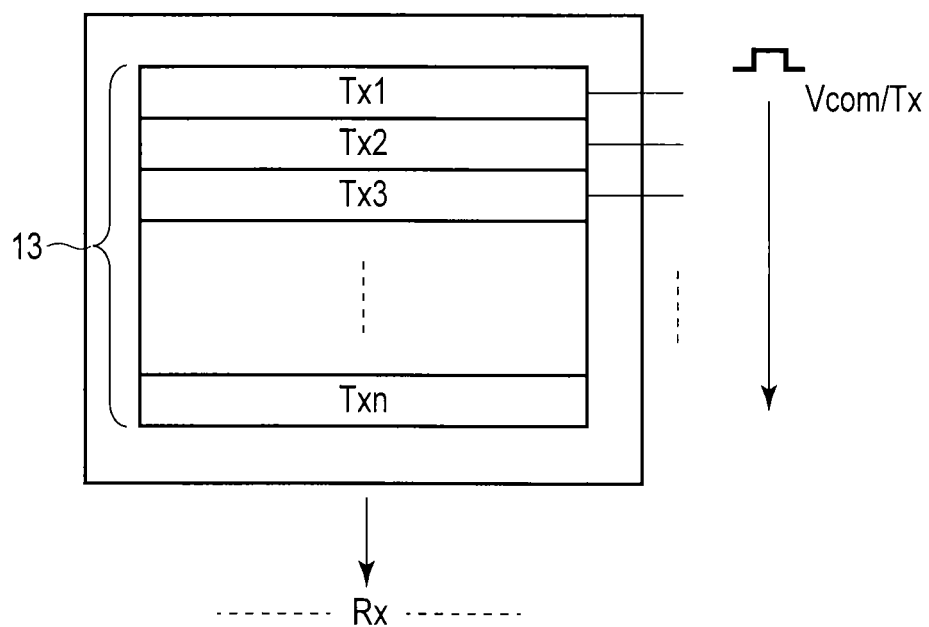
F I G. 5 B
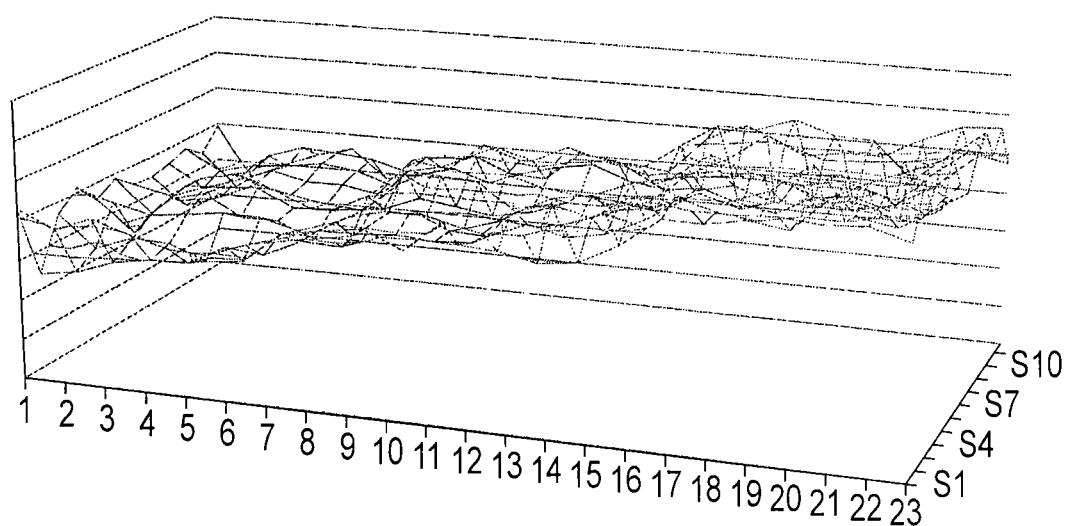
< No touch >
F I G. 6

< Touched >

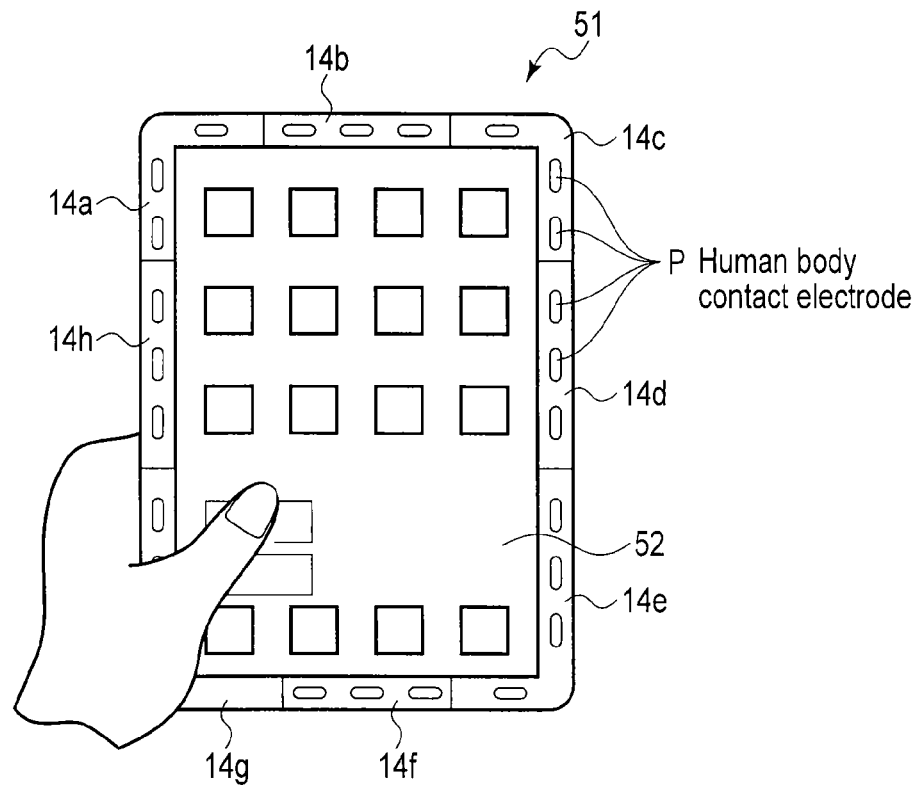
F I G. 1 1 A
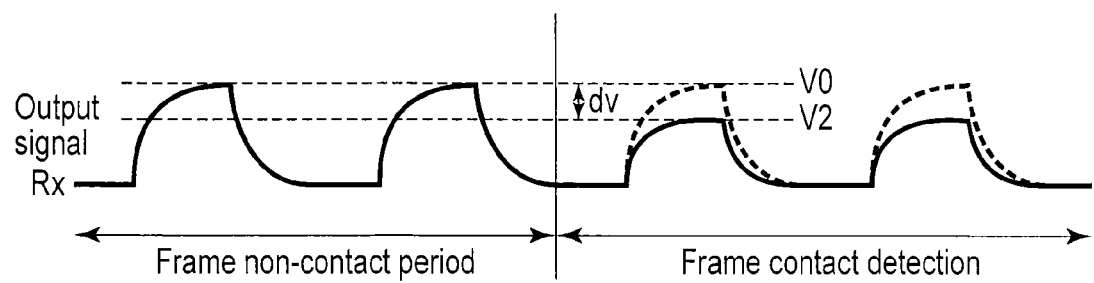
F I G. 1 1 B

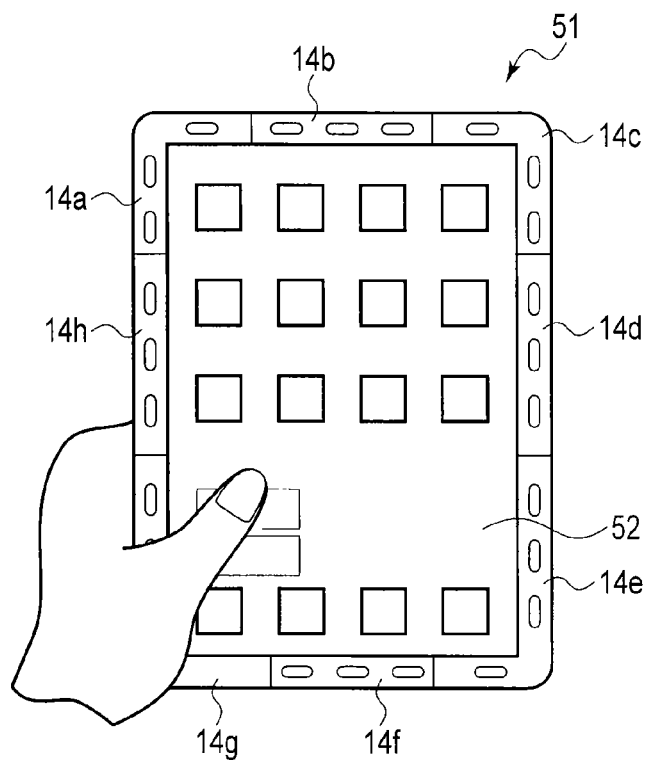
F I G. 12 A
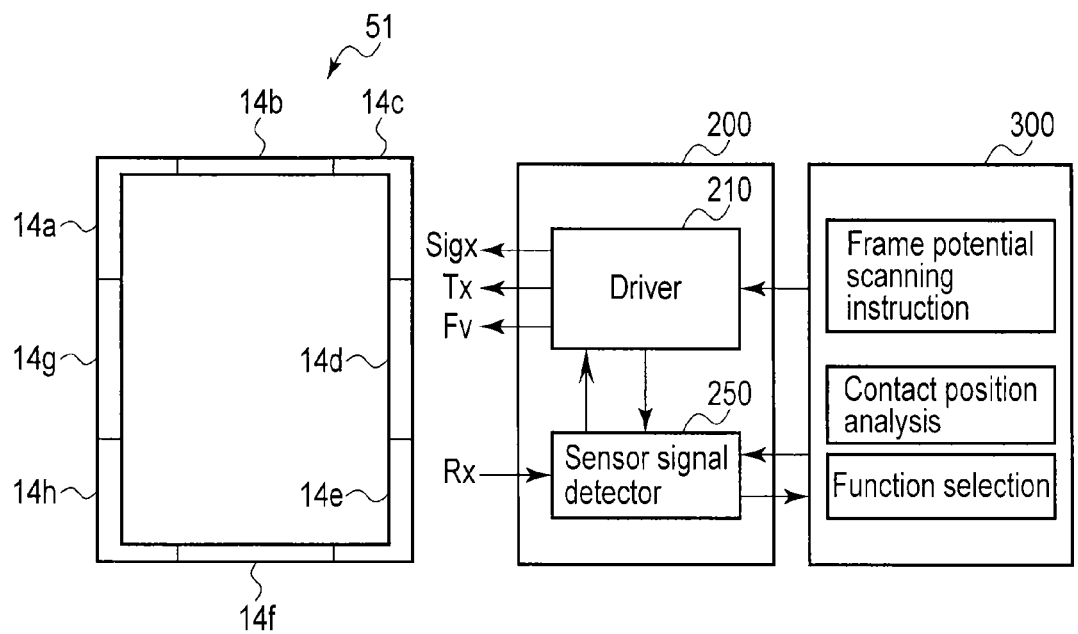
F I G. 12 B

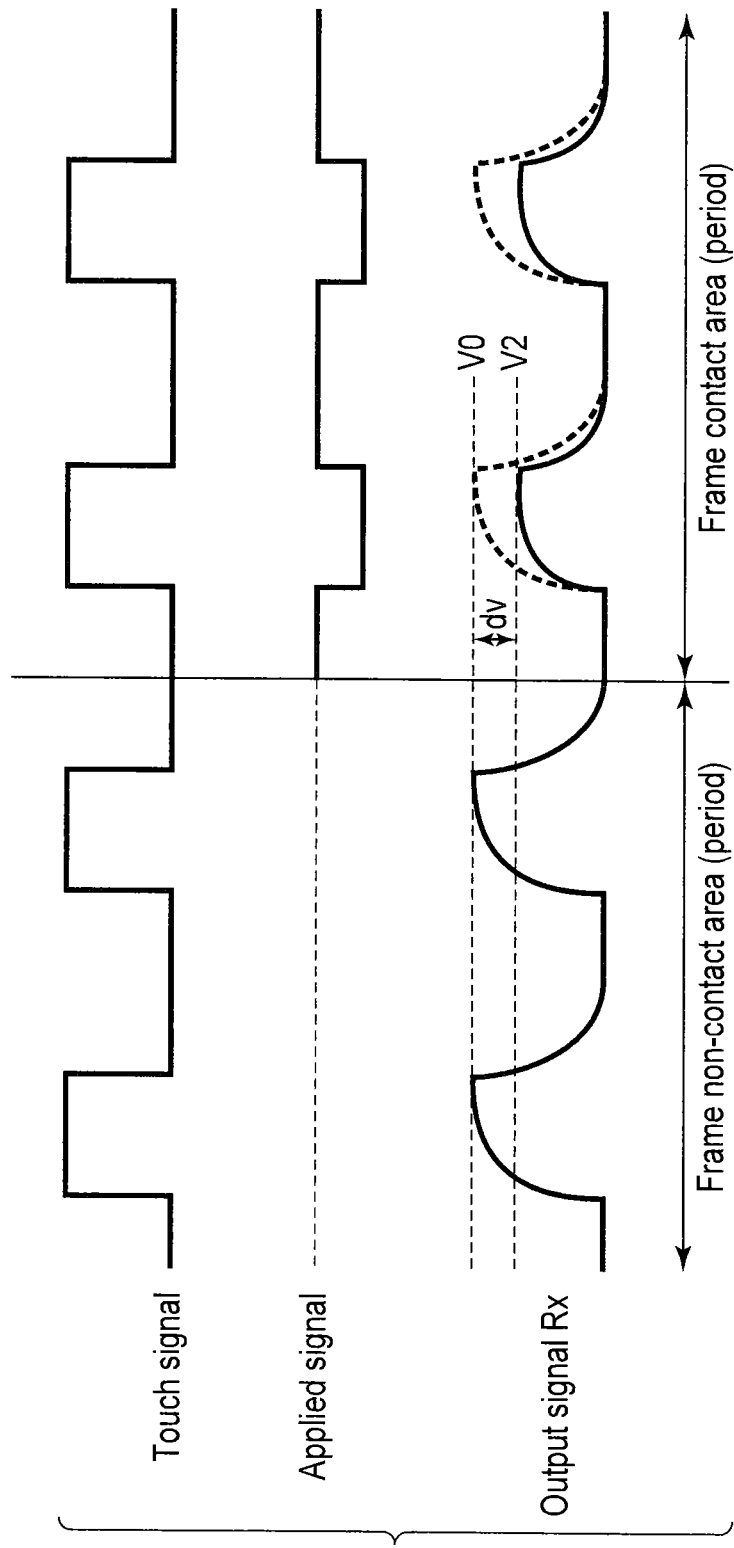
F I G. 13

ELECTRONIC DEVICE AND METHOD FOR CONTROLLING THE ELECTRONIC DEVICE

CROSS-REFERENCE TO RELATED APPLICATIONS

This application is a continuation of U.S. application Ser. No. 14/183,957 filed Feb. 19, 2014, and is based upon and claims the benefit of priority from Japanese Patent Application No. 2013-073869, filed Mar. 29, 2013, the entire contents of each of which are incorporated herein by reference.

FIELD

Embodiments described herein relate generally to an electronic device and a method for controlling the electronic device.

BACKGROUND

Mobile phones, tablets, personal digital assistants (PDA), small-sized portable personal computers and the like are popularized. These electronic devices have a display panel and an operation input panel that is formed integrally with the display panel as one piece.

The operation input panel can detect a touch position on its surface where a user touches, and generates a sensing signal as a change of capacitance, for example. The sensing signal is supplied to a touch signal processing integrated circuit (IC) which is designed to exclusive use for the operation input panel. The touch signal processing IC processes the sensing signal using a computational algorithm prepared in advance, and converts the user's touched position into coordinate data then output it.

As manufacturing technology is developed, the display panel is increased in resolution and size. Accordingly, the operation input panel is required to sense a position with high resolution. The operation input panel is also required to process data input thereto at high speed depending on applications. Furthermore, a device capable of easily changing an application is desired.

BRIEF DESCRIPTION OF THE DRAWINGS

FIG. 1 is a block diagram of an electronic device according to an embodiment;

FIG. 2B is an illustration of the principle for generating a touch sensing signal from a signal which is output from the operation input panel;

FIG. 3 is a perspective view illustrating sensor components of the operation input panel and a method for driving the sensor components;

FIG. 5B is a schematic view illustrating the output based on the drive signal for the sensor drive electrode and a driving state of a common electrode;

FIG. 6 is a graph of raw data (sensed data) output from the sensor when no input operation is performed;

FIG. 11A is a simplified diagram showing another example of use of the mobile terminal according to the present embodiment;

FIG. 11B is a chart of a signal waveform of a signal output from a sensor in the mobile terminal shown in FIG. 11A;

FIG. 12A is a simplified diagram showing still another example of use of the mobile terminal according to the present embodiment;

FIG. 12B is a block diagram showing a signal output from the sensor in the mobile terminal shown in FIG. 12A; and FIG. 13 is a chart illustrating a touch signal and an output signal of the sensor in the mobile terminal shown in FIG. 12A.

DETAILED DESCRIPTION

Figure 2A:
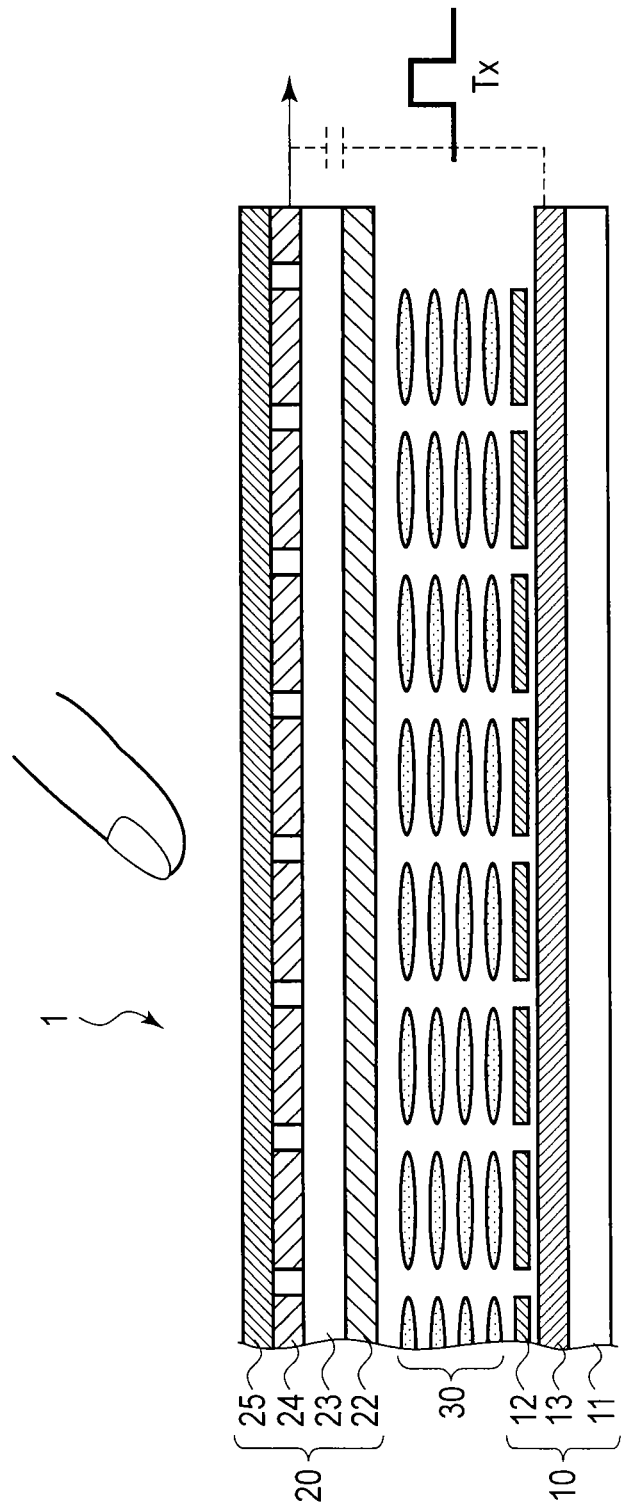
FIG. 2A is a sectional view illustrating a sensor-integrated display device including a display surface or a display panel and an operation surface or an operation input panel.

Various embodiments will be described hereinafter with reference to the accompanying drawings.

In general, according to one embodiment, there are provided an electronic device which is flexibly adaptable to a variety of applications and which can receive a number of input information for the applications, and a method for controlling the electronic device.

According to an embodiment of the present disclosure, a sensor-integrated display panel including an operation surface for performing an input operation and an image display surface which are formed integrally with a sensor as one piece. A data transfer device supplies the sensor-integrated display panel with a drive signal for driving the sensor and outputs sensing data corresponding to a potential of a sensor signal output from the sensor. A contact electrode is provided in a frame formed around the sensor-integrated display panel to vary the potential of the sensor signal based on whether a conductor touches the frame or the conductor does not touch the frame. An application executing device receives and analyzes the sensing data and generates a signal to select an operating function in accordance with an analysis result.

According to the embodiment, a number of usage types of input information for, e.g., an input operation and a number of determination functions can be set by the application executing device, and the device can easily be used in different and various ways. Moreover, the device can be increased in function by associating the frame with touch data.

An embodiment will further be described with reference to the drawings.

FIG. 1 shows a mobile terminal 1 according to the embodiment. The mobile terminal 1 includes a sensor-integrated display device 100. The device 100 is formed integrally with a display surface (or a display panel) and an operation surface (or an operation input panel or a touch panel) and includes a display device component 110 and a sensor component 150 for these surfaces.

The sensor-integrated display device 100 is supplied with a display signal (or a pixel signal) from a driver 210, which will be described later. When the device 100 receives a gate signal from the driver 210, a pixel signal is input to a pixel of the display device component 110. A voltage between a pixel electrode and a common electrode depends upon the pixel signal. This voltage displaces liquid crystal molecules between the electrodes to achieve brightness corresponding to the displacement of the liquid crystal molecules.

The sensor-integrated display device 100 may be called an input sensor-integrated display unit, a user interface or the like.

The display device component 110 may employ a liquid crystal display panel, a light-emitting element such as an LED, or organic EL. The display device component 110 can be simply called a display. The sensor component 150 is of a capacitance change sensing type. The sensor component 150 can be called a panel for sensing a touch input, a gesture and the like.

The sensor-integrated display device 100 is connected to an application executing device 300 via a data transfer device 200.

The data transfer device 200 includes a driver 210 and a sensor signal detector 250. Basically, the driver 210 supplies the display device component 110 with graphics data that is transferred from the application executing device 300. The sensor signal detector 250 detects a sensor signal output from the sensor component 150.

The driver 210 and sensor signal detector 250 are synchronized with each other, and this synchronization is controlled by the application executing device 300.

The application executing device 300 is, for example, a semiconductor integrated circuit (LSI), which is incorporated into an electronic device, such as a mobile phone. The device 300 complexly performs a plurality of functions, such as Web browsing and multimedia processing, using software with an OS.

These application processors perform a high-speed operation and can be configured as a dual core or a quad core. Favorably, the operation speed is, for example, 500 MHz and, more favorably, it is 1 GHz.

The driver 210 supplies a display signal (a signal into which the graphics data is converted to an analog signal) to the display device component 110 on the basis of an application. In response to a timing signal from the sensor signal detector 250, the driver 210 outputs a drive signal Tx for scanning the sensor component 150. In synchronization with the drive signal Tx, the sensor component 150 outputs a sensor signal Rx and supplies it to the sensor signal detector 250.

The sensor signal detector 250 detects the sensor signal, eliminates noise therefrom, and supplies the noise-eliminated signal to the application executing device 300 as raw reading image data (which may be called as three-dimensional image data).

When the sensor component 150 is of a capacity sensing type, the image data is not only two-dimensional data simply representing a coordinate but have a plurality of bits (e.g., three to seven bits) which vary with the capacitance. Thus, the image data can be called three-dimensional data including a physical quantity and a coordinate. The capacitance varies with the distance between a target (e.g., a user's finger) and a touch panel, the variation can be captured as a change in physical quantity.

Below is the reason that the sensor signal detector 250 of the data transfer device 200 directly supplies image data to the application executing device 300, as described above.

The application executing device 300 is able to perform its high-speed operating function to use the image data for various purposes.

New different applications are applied to the application executing device 300 according to user's various desires. The new applications may require a change or a selection of image data processing method, reading (or detection) timing, reading (or detection) format, reading (or detection) area, and reading (or detection) density depending on the data processing type.

If only the coordinate information is acquired as in the prior art device, the amount of acquired information is restricted. In the device of the present embodiment, however, if the raw three-dimensional image data is analyzed, for example, distance information as well as the coordinate information can be acquired.

It is desired that the data transfer device 200 should easily follow different operations under the control of applications in order to expand the functions by the applications. Thus, the device 200 is configured to select sensor signal reading timing, a reading area, a reading density or the like arbitrarily under the control of applications as a simple function. This point will be described later.

The application executing device 300 may include a graphics data generation unit, a radio interface, a camera-facility interface and the like.

FIG. 2A is a cross sectional view of a basic structure of the sensor-integrated display device 100 in which the display device component 110 and sensor component 150, or the display panel and operation input panel are formed integrally with each other as one piece.

An array substrate 10 in which a common electrode 13 is formed on a thin-film transistor (TFT) substrate 11 and a pixel electrode 12 is formed above the common electrode 13 with an insulation film between them. A counter substrate 20 is arranged opposite to and parallel with the array substrate 10 with a liquid crystal layer 30 between them. In the counter substrate 20, a color filter 22, a glass substrate 23, a sensor detecting electrode 24 and a polarizing plate 25 are formed in order from the liquid crystal layer 30.

The common electrode 13 is served as a drive electrode for a sensor (or a common drive electrode for a sensor) as well as a common electrode for display.

FIG. 2B shows the voltage which is varied from V0 to V1 when a conductor, such as a user's fingertip, is close to an intersection between the common electrode and the sensor drive electrode, the voltage is generated from the intersection and read out through the sensor detecting electrode. When the user's finger is not in contact with the touch panel, current corresponding to the capacity of the intersection (referred to as a first capacitive element hereinafter) flows according to the charge/discharge of the first capacitive element. At this time, the first capacitive element has, for example, potential waveform V0 at one of electrode of the first capacitive element, as shown in FIG. 2B. When the user's finger moves close to the sensor detect electrode, a second capacitive element is formed by the finger and connected to the first capacitive element. In this state, current flows through each of the first and second capacitive elements when these elements are droved and charged/ discharged. At this time, the first capacitive element has, for example, potential waveform V1 at the one of electrode, as shown in FIG. 2B, and this potential waveform is detected by a detection circuit. At this time, the potential of the one of electrode of the first capacitive element is a divided potential which depends upon the current flowing through the first and second capacitive elements. Thus, the value of waveform V1 is smaller than that of waveform V0. It is therefore possible to determine whether a user's finger is in contact with a sensor by comparing a sensor signal Rx and a threshold value Vth with each other.

FIG. 3 is a perspective view illustrating the sensor component of the operation input panel and a method for driving the sensor component and showing a relationship in arrangement between the sensor detecting electrode 24 and the common electrode 13. The arrangement shown in FIG. 3 is one example and thus the operation input panel is not limited to it.

Figure 4:
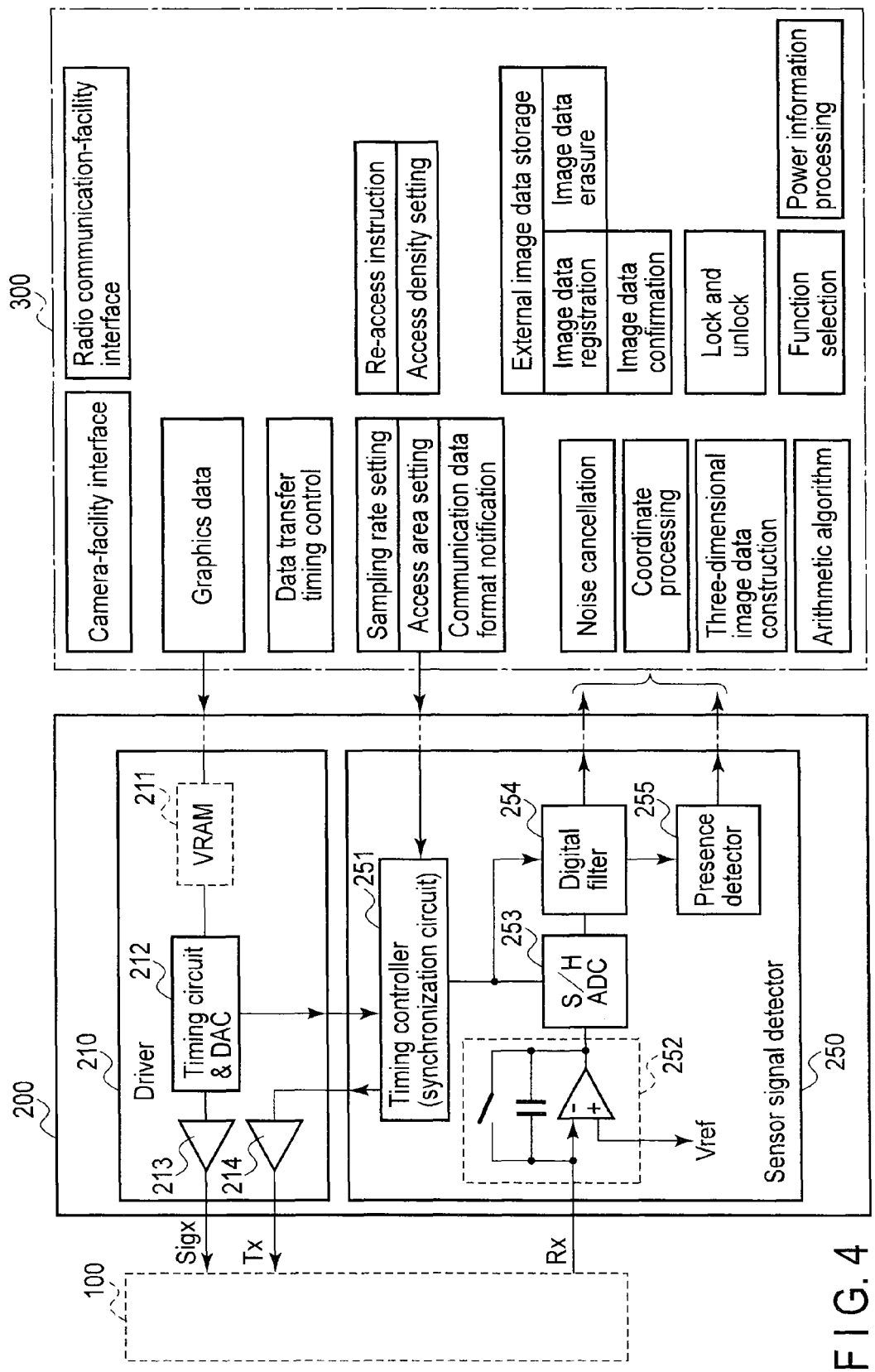
FIG. 4 is a block diagram of a data transfer device shown in FIG. 1, and some of the functions that are realized by different applications in an application executing device shown in FIG. 1.

FIG. 4 shows the sensor-integrated display device 100, data transfer device 200 and application executing device 300 and also shows the internal components of the data transfer device 200 and application executing device 300.

The data transfer device 200 mainly includes the driver 210 and the sensor signal detector 250. The driver 210 and the sensor signal detector 250 can be called an indicator driver IC and a touch IC, respectively. Though they are separated from each other, they can be formed integrally as one chip.

The driver 210 receives display data from the application executing device 300. The display data is time-divided and has a blanking period. The display data is supplied to a timing circuit and digital-to-analog converter 212 through a video random access memory (VRAM) 211 serving as a buffer. In mobile terminal 1, the VRAM 211 may have a capacity of one frame or smaller.

A display signal SigX indicative of an analog quantity is amplified by an output amplifier 213 and supplied to the sensor-integrated display device 100 for writing it to a display element. The timing circuit and digital-to-analog converter 212 detects a blanking signal or a blanking period and supplies a detected signal to a timing controller 251 of the sensor signal detector 250. The timing controller 251 may be provided in the driver 210 and called a synchronization circuit.

The timing controller 251 generates a drive signal to drive the sensor during a given period of the display signal (which may be a blanking period of the display signal, for example). The drive signal is amplified by an output amplifier 214 and supplied to the sensor-integrated display device 100.

The drive signal Tx drives the sensor detecting electrode to output the sensor signal Rx from the sensor-integrated display device 100. The sensor signal Rx is input to an integrating circuit 252 in the sensor signal detector 250. The sensor signal Rx is compared with a reference voltage (threshold value) Vref by the integrating circuit 252. If the level of the sensor signal Rx is the reference voltage or higher, the integrated circuit 252 integrates the sensor signal Rx in a capacitor and outputs an integral signal. Then, the sensor signal Rx is reset by a switch for each detection unit time period, and an analog signal can be output based on the sensor signal Rx. The analog signal from the integrating circuit 252 is supplied to a sample hold and analog-to-digital converter 253 and converted to digital data. The digital data is supplied as raw data to the application executing device 300 through a digital filter 254.

The digital data is three-dimensional data (multivalued data) including both the detected data and non-detected data of an input operation. A presence detector 255 operates when the application executing device 300 is in a sleep mode and no coordinates of a touched position on the operating surface are detected. If there is any object close to the operating surface, the presence detector 255 is able to sense the object and release the sleep mode.

The application executing device 300 receives and analyzes the digital data. In accordance with a result of the analysis, the device 300 is able to output the display data or select an operating function of the mobile terminal.

The application executing device 300 is able to expand different applications and set an operating procedure of the device, select a function, generate and select a display signal, select a display signal, and the like. Using a sensor signal output from the sensor signal detector 250, the device 300 is able to analyze an operating position through coordinate processing. The sensor signal is processed as image data and thus three-dimensional image data can be formed by an application. The device 300 is also able to, for example, register, erase and confirm the three-dimensional image data. Furthermore, the device 300 is able to compare the registered image data with the acquired image data to lock or unlock an operating function.

Upon acquiring the sensor signal, the application executing device 300 is able to change the frequency of a drive signal from the timing controller 251 to the sensor detecting electrode and control the output timing of the drive signal. Accordingly, the device 300 is able to select a driving area of the sensor component 150 and set the driving speed thereof.

Furthermore, the application executing device 300 is also able to detect the density of the sensor signal and add data to the sensor signal.

Figure 5A:
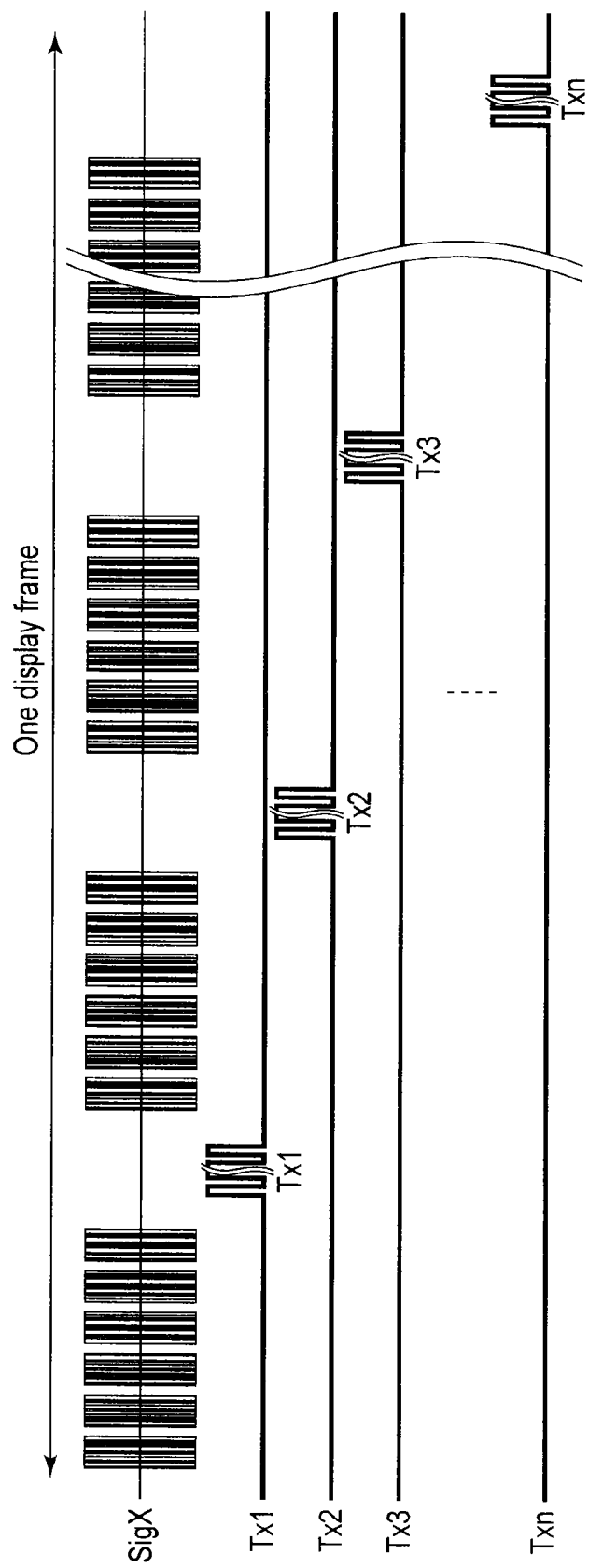
FIG. 5A is a chart showing an example of output timing between a display signal and a drive signal for a sensor drive electrode, which are output from the driver shown in FIGS. 1 and 4.

FIG. 5A shows an example of a timing chart between the time-divided display data SigX and the sensor drive signal Tx (Tx1-Txn) which are output from the data transfer device 200. FIG. 5B schematically shows that the sensor component 150 including the common electrode and the sensor detecting electrode is two-dimensionally scanned by a common electrode Vcom and the sensor drive signal Tx. The common voltage Vcom is applied to the common electrode 13 in order. And the common electrode 13 is applied the drive signal Tx to obtain a sensor signal during a given period of time.

The display data SigX and the sensor drive signal Tx may be supplied from the application executing device 300 to the driver 210 by time division via the same bus. Furthermore, the display data SigX and the sensor drive signal Tx can be separated from each other by the timing circuit and digital-to-analog converter 212. The sensor drive signal Tx is supplied to the common electrode 13, described above, via the timing controller 251 and the amplifier 214. For example, the timing at which the timing controller 251 outputs the sensor drive signal Tx and the frequency of the sensor drive signal TX can be varied according to an instruction of the application executing device 300. The timing controller 251 is able to supply a reset timing signal to the the integrating circuit 252 of the sensor signal detector 250 and also supply a clock to the sample hold and analog-to-digital converter 253 and the digital filter 254.

FIG. 6 is a graph showing an example of raw data output from the sensor when no input operation is detected.

Figure 7:
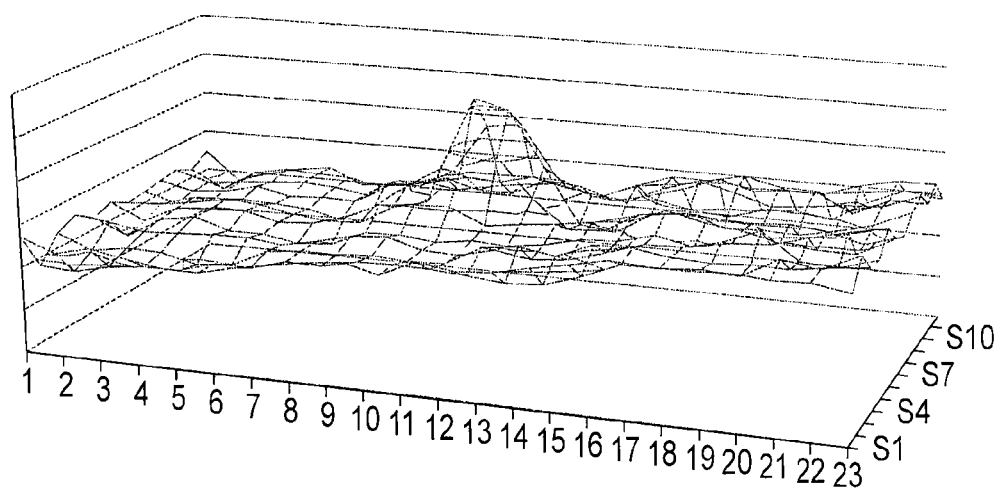
FIG. 7 is a graph of raw data (sensed data) output from the sensor when an input operation is performed.

FIG. 7 is a graph showing an example of raw data output from the sensor when an input operation is detected.

Figure 8A:
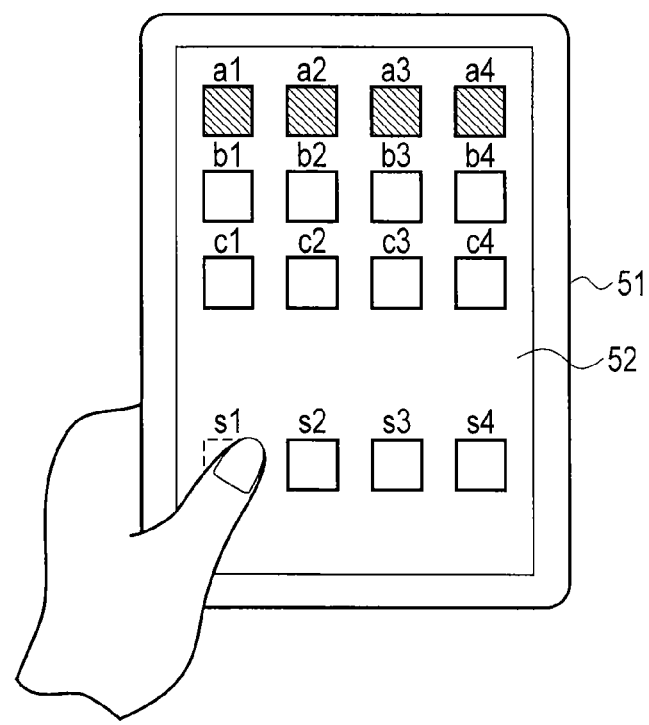
FIG. 8A is a simplified diagram showing an example of use of a mobile terminal according to the present embodiment.
Figure 8B:
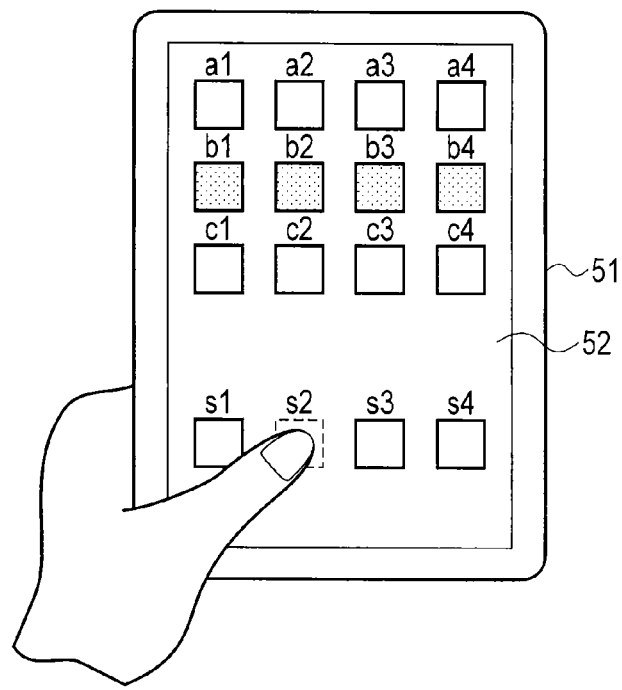
FIG. 8B is a simplified diagram showing another example of use of the mobile terminal according to the present embodiment.

FIGS. 8A and 8B each show an example of use of the mobile terminal 1. The mobile terminal 1 has a display and operation surface 52 that is surrounded by a frame (casing) 51.

On the display and operation surface 52, different images are displayed according to applications. In the examples of FIGS. 8A and 8B, different selection buttons a1-a4, b1-b4, c1-c4, . . . s1-s4 are displayed as images.

In the example of FIG. 8A, a user touches, for example, the selection button s1 with his or her thumb and selects it. At this time, the display and operation surface 52 indicates that one of the selection buttons a1-a4, for example is selectable. Accordingly, display states of the selection buttons a1-a4 are changed, highlighted for example, and the other selection buttons b1-b4 and c1-c4 are displayed in gray, for example.

In the example of FIG. 8B, a user touches, for example, the selection button s2 with his or her thumb and selects it. At this time, the display and operation surface 52 indicates that one of the selection buttons b1-b4, for example is selectable. Accordingly, the selection buttons b1-b4 are highlighted and the other selection buttons a1-a4 and c1-c4 are displayed in gray, for example.

As described above, the mobile terminal 1 includes the selection buttons. The selection buttons allow a user to select an operating mode or an operating function by one hand. Thus, the user can select an operating mode or an operating function by the left hand and perform an input operation by the right hand.

Figure 9A:
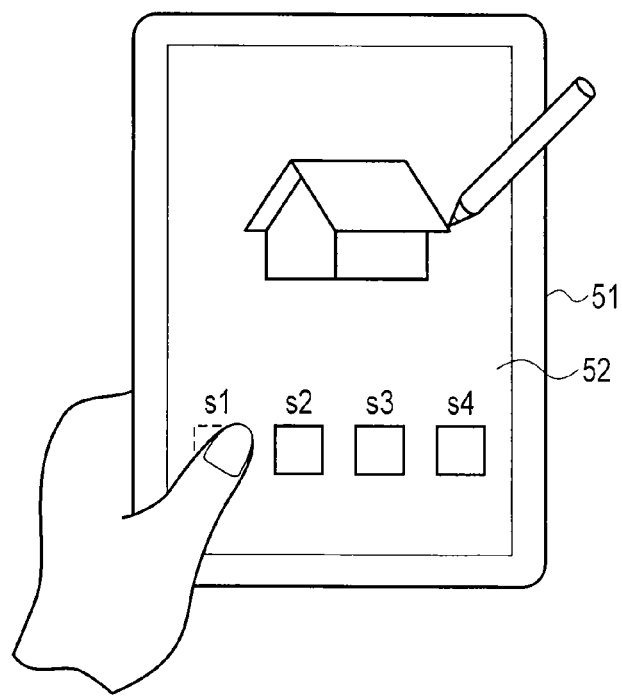
FIG. 9A is a simplified diagram showing still another example of use of the mobile terminal according to the present embodiment.

FIG. 9A shows an example of the operation of the mobile terminal 1 performed when a drawing application is started. In this example, a user touches the selection button s1 with his or her thumb. At this time, a drawing line input by, for example, a stylus is displayed thickly according to the drawing application.

Figure 9B:
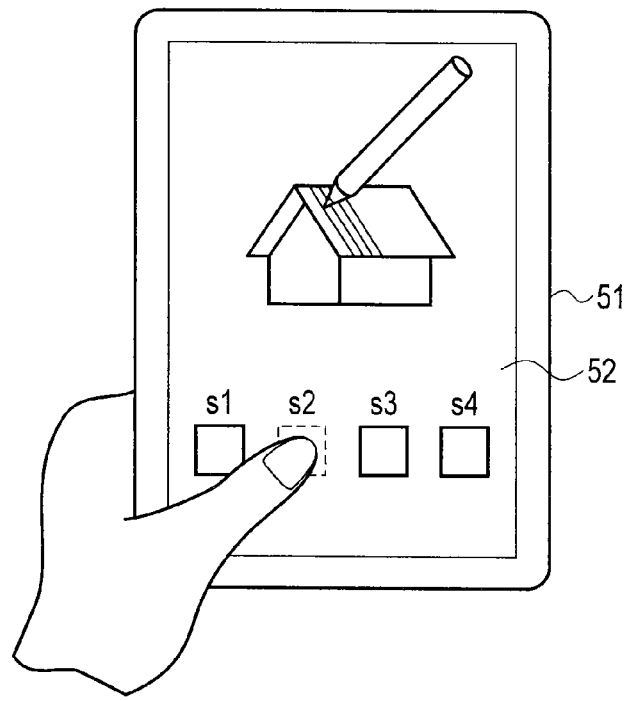
FIG. 9B is a simplified diagram showing yet another example of use of the mobile terminal according to the present embodiment.

FIG. 9B shows an example in which the user touches the selection button s2 with the thumb. At this time, a drawing line input by, for example, a stylus is displayed thinly according to the drawing application.

When the user touches another selection button with his or her left thumb, a stylus input operation performed by the right hand work as a rubber eraser.

The mobile terminal 1 is not limited to the above embodiment. The mobile terminal 1 can be so configured that the user can touch, for example, a coloring selection button by one hand. When the user colors a drawn figure as shown in FIG. 9B, the coloring can be changed by the operation described with reference to FIGS. 8A and 8B or FIGS. 9A and 9B.

In the mobile terminal 1, the capacity for image data varies according to the distance between a target (e.g., a user's fingertip) and the touch panel and thus the image data can be processed as not only coordinate information but also three-dimensional data that indicates the variation captured as a variation in physical quantity.

Thus, an application for recognizing a three-dimensional shape as well as a coordinate, an application for recognizing movement characteristics of the object when an object moves on the operating surface, or the like can be used. If these applications are used, a threshold value can be set or varied to capture the three-dimensional image data. More specifically, in the mobile terminal 1, three-dimensional image data is transferred to the application executing device, and the three-dimensional image data can be modified into different forms, adjusted, changed or the like to use, thereby bringing about a number of advantages of recognition of three-dimensional distance, recognition of three-dimensional shape and the like.

In the mobile terminal 1 described above, a function can be selected, some of the functions can be started or stopped, or a method for capturing three-dimensional image data can be changed according to a position on which a user touches. Setting or switching in usage types of the three-dimensional image data described above may be set depending on the combination with a detection signal of a touch (contact) to the frame, which will be described as follows.

Figure 10:
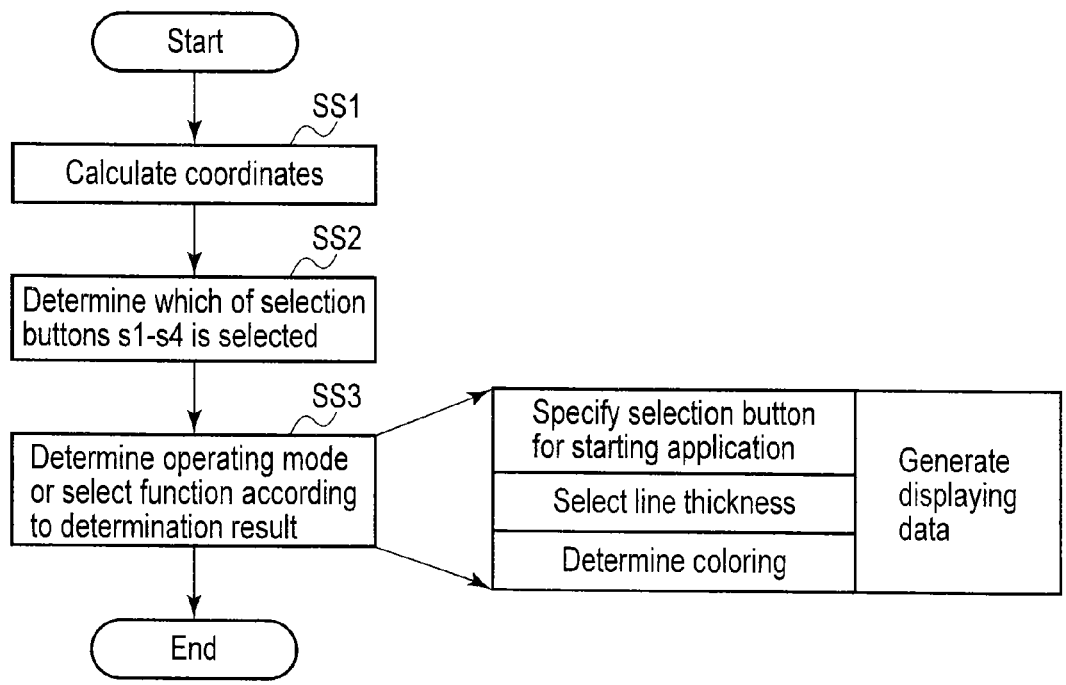
FIG. 10 is a flowchart of an application for achieving the examples of use of the mobile terminal shown in FIGS. 8A, 8B, 9A and 9B.

FIG. 10 shows a procedure of an operation that is performed by the application executing device 300 in order to perform the operations illustrated in FIGS. 8A through 9B. Coordinate processing is applied to three-dimensional image data generated from the sensor (step SS1). In the coordinate processing, it is determined which selection button is selected (step SS2). In accordance with a result of the determination, an operating mode is determined and a function is selected (step SS3)

FIGS. 11A and 11B show a mobile terminal according to another embodiment, in which a function or an operation is selected according to whether a user (human body) touches the frame or not.

In the embodiment shown in FIGS. 11A and 11B, a plurality of conductor contact electrodes P are arranged in a frame 51 served as a case, for example. When the mobile terminal is turned on and left for a fixed time period, a conductor (reference potential conductor) of the lowest potential (usually called a ground potential or a reference potential) is connected to each of the conductor contact electrodes P through a switch. This switch is controlled by a driver 210.

When the user touches the conductor contact electrodes P (or the user holds the mobile terminal by the left hand, for example) and touches the operation surface of the mobile terminal with the right hand, the level of a sensor output signal decreases from V0 to V2 and at this time a difference potential vd becomes relatively high. This is because the reference potential of the mobile terminal in the normal mode is further lowered (becomes zero) due to the contact of the human body.

If an application determines the above sensing (the contact of the human body), it turns off a switch between the conductor contact electrodes P and the reference potential conductor, then cuts off the frame contact sensing function. Moreover, the application is able to start an operation input determination function, and to set a proper status of use of the mobile terminal. In the subsequent normal operation, when an input operation is detected, the sensor output signal corresponds to output voltage V1 that is decreased from V0, as described with reference to FIG. 2B.

FIGS. 12A and 12B show still another embodiment in which a rectangular frame 51 is divided into a plurality of areas 14a to 14h and a plurality of conductor contact electrodes P are distributed to the areas 14a to 14h. In this embodiment, it can be determined what area includes a conductor contact electrode P that is in contact with a human body. For example, the conductor contact electrodes P from the areas 14a to 14h are sequentially switched to an active state, and an area where a difference voltage dv (see FIG. 11B) is detected is determined. To make the conductor contact electrodes P of the areas 14a to 14h active and inactive in sequence, a switch between the conductor contact electrodes P and the reference potential conductor has only to be turned on or off on time-division basis in response to a frame electrode control signal Fv. If a drive signal is supplied when the switch is turned on, a sensor output signal can be generated.

The frame electrode control signal Fv is output from, for example, the driver 210, as shown in FIG. 12B. The signal output from a frame electrode served as a sensor is derived as Rx. Rx is data detected by and output from the sensor signal detector 250.

The application executing device 300 includes an electrode control signal instruction unit (or a frame potential scanning instruction) for outputting the frame electrode control signal Fv, a contact position analysis unit for analyzing the sensor output signal, and a function selection unit for selecting a function in accordance with a result of the analysis. In order to fulfill the functions of these units, the application executing device 300 outputs an instruction on the basis of the operating procedure of an application.

FIG. 13 illustrates a signal waveform to describe an example of an operation of the above embodiment. In FIG. 13, a touch signal is a signal for making areas 14a to 14h of a frame active and inactive in sequence in response to the frame electrode control signal Fv. Assuming here that a conductor contact electrode of, e.g., an area 4g as shown in FIG. 12A is made active and a user touches a position on the operation surface with his or her right fingertip, a negative potential (applied signal) which is lower than the reference potential is applied to the position in which the user touches with the fingertip. Therefore, as described with reference to FIG. 11B, a high difference potential dv other than a normal one is generated as Rx, with the result that the application executing device 300 is able to recognize that the user holds an area 14g of a frame 15.

In the mobile terminal, an operating function can be selected in accordance with a user's holding position by making use of the above functions. For example, it can be determined whether the user is a right-handed person or a left-handed person in accordance with the holding position. An operating mode can be selected according to whether the user is a right-handed person or a left-handed person. Furthermore, it can be determined whether the user holds the mobile terminal by both hands.

When it is determined whether the user is a right-handed person or a left-handed person, a selection button can be displayed for the right-handed person or the left-handed person. When the user holds the mobile terminal by both hands, the operating mode may be changed to a camera shooting mode. When an operating mode is selected in accordance with the user's holding position, it may be displayed by a message or notified by voice.

According to the above-described mobile terminal, a time period during which an input operation on the operation surface is detected and a time period during which a user touches the frame can be set on time-division basis. For example, while detecting an input operation, the mobile terminal is able to determine a position of the frame which the user touches. If the user touches another position thereof, an application for selecting an operating function of the mobile terminal can be employed.

In the foregoing description, the sensor-integrated display device is configured to include a liquid crystal display device as a display device; however, it can be configured to include another display device such as an organic electroluminescence display device. In the example shown in FIG. 2, the liquid crystal device is so configured that an array substrate includes both a pixel electrode and a common electrode, or a lateral electric field (including a fringe electric field) is utilized chiefly in an in-plane switching (IPS) mode, a fringe field switching (FFS) mode or the like. The liquid crystal display device is not limited to this configuration. At least the pixel electrode can be included in the array substrate and the common electrode can be included in either one of the array substrate and counter substrate. If a vertical electric field is utilized chiefly in a twisted nematic (TN) mode, an optically compensated bend (OCB) mode, a vertical aligned (VA) mode or the like, the common electrode is included in the counter substrate. In other words, the common electrode has only to be arranged between an insulation substrate that constitutes the TFT substrate and an insulation substrate that constitutes the counter substrate.

The names of the blocks and components are not limited to those described above, nor are the units thereof. The blocks and components can be shown in a combined manner or in smaller units. Even though the term "unit" is replaced with "device," "section," "block" and "module," they naturally fall within the scope of the present disclosure. Even though the structural elements in the claims are each expressed in a divided manner or they are expressed in a combined manner, they fall within the scope of the present disclosure. The method claim corresponds to the device claim.

The above embodiments of the present disclosure are each described as an example and do not aim at limiting the scope of the present disclosure. The embodiments can be reduced to practice in different ways, and their structural elements can be omitted, replaced and modified in different ways without departing from the spirit of the disclosure. Even though the structural elements are each expressed in a divided manner or they are expressed in a combined manner, they fall within the scope of the present disclosure. Even though the claims are recited as step claims or program claims, these claims correspond to the device claims. The embodiments and their modifications fall within the scope and spirit of the disclosure and also fall within the scope of the disclosure recited in the claims and its equivalents.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a sensor-integrated display panel configured to include an operation surface for performing an input operation and an image display surface, which are formed integrally with a sensor as one piece;
   a data transfer device configured to supply the sensor-integrated display panel with a drive signal for driving the sensor and to output sensing data corresponding to a potential of a sensor signal output from the sensor;
   a contact electrode configured to be provided in a frame formed around the sensor-integrated display panel to cause the potential of the sensor signal to vary from a case in which a conductor touches the frame to a case in which the conductor does not touch the frame; and an application executing device configured to receive and analyze the sensing data and generate a signal to select an operating function in accordance with an analysis result, wherein the frame includes a plurality of areas, the contact electrode is arranged in each of the areas and driven on a time division base, and the application executing device identifies the areas by a variation in the potential of the sensor signal.

2. The electronic device of claim 1, wherein the potential of the sensor signal varies with the contact electrode in the case in which the conductor touches the frame more greatly than the case in which the conductor does not touch the frame.

3. The electronic device of claim 1, wherein the application executing device starts to receive a sensor signal corresponding to an input operation on to the operation surface, if the analysis result is a variation in the potential of the sensor signal due to the contact electrode.

4. The electronic device of claim 1, wherein the application executing device outputs an instruction to select an operating function when the analysis result indicates a variation in the plurality of areas.

5. A method for controlling an electronic device including: a sensor-integrated display panel including an operation surface for performing an input operation and an image display surface, which are formed integrally with a sensor as one piece; a data transfer device which supplies the sensor-integrated display panel with a drive signal for driving the sensor and outputs sensing data corresponding to a potential of a sensor signal output from the sensor; a contact electrode provided in a frame formed around the sensor-integrated display panel to cause the potential of the sensor signal to vary from a case in which a conductor touches the frame to a case in which the conductor does not touch the frame, wherein the frame includes a plurality of areas and the contact electrode being arranged in each of the areas; and an application executing device which receives and analyzes the sensing data and generates a signal to select an operating function in accordance with an analysis result, the method comprising:

driving the contact electrode which is arranged in each of the areas on a time division base;

identifying the areas by a variation in the potential of the sensor signal; and outputting an instruction to select an operating function when the sensor signal due to the contact electrode is detected.

6. The method of claim 5, further comprising:
starting to receive a sensor signal corresponding to an input operation to the operation surface when a sensing signal is output from the contact electrode.

7. The method of claim 5, further comprising:
changing display data to be supplied to the sensor-integrated display panel in accordance with an area identification result.

8. The method of claim 5, further comprising:
selecting an operating function in accordance with an area identification result.

* * * * *